United States Patent
Isip, Jr.

(10) Patent No.: US 6,189,010 B1
(45) Date of Patent: Feb. 13, 2001

(54) METHOD FOR REPAIRING CONSTRAINT VIOLATIONS IN A DATABASE MANAGEMENT SYSTEM

(75) Inventor: Amando B. Isip, Jr., Richardson, TX (US)

(73) Assignee: Platinum Technology, Inc., Oakbrook Terrace, IL (US)

(*) Notice: Under 35 U.S.C. 154(b), the term of this patent shall be extended for 0 days.

(21) Appl. No.: 09/095,449

(22) Filed: Jun. 10, 1998

(51) Int. Cl.[7] .................................................. G06F 17/30
(52) U.S. Cl. ................................................. 707/100; 707/8
(58) Field of Search ................................... 707/3, 9, 102, 707/100, 2, 8

(56) References Cited

U.S. PATENT DOCUMENTS

| | | | |
|---|---|---|---|
| 4,933,848 | 6/1990 | Haderle et al. | 364/300 |
| 4,947,320 | 8/1990 | Crus et al. | 364/200 |
| 5,226,158 | 7/1993 | Horn et al. | 395/600 |
| 5,241,648 | 8/1993 | Cheung et al. | 395/600 |
| 5,386,557 * | 1/1995 | Boykin et al. | 707/1 |
| 5,513,350 * | 4/1996 | Griffin et al. | 395/702 |
| 5,551,029 * | 8/1996 | Jagadish et al. | 707/103 |
| 5,553,218 * | 9/1996 | Li et al. | 707/102 |
| 5,706,494 | 1/1998 | Cochrane et al. | 707/2 |
| 5,745,896 * | 4/1998 | Vijaykumar | 707/100 |
| 5,873,075 * | 2/1999 | Cochrane et al. | 707/2 |
| 5,899,993 * | 5/1999 | Jenkins, Jr. | 707/9 |
| 5,950,188 * | 9/1999 | Wildermuth | 707/3 |
| 5,950,210 * | 9/1999 | Nelson | 707/203 |
| 6,065,017 * | 5/2000 | Barker | 707/202 |

OTHER PUBLICATIONS

Yoon, J.P., et al., "Semantic update optimization in active databases", Database Applications Semantics, Proc. of the IFIP WG 2.6 Working Conf. on DB Appl Semantics, Jun. 1995, pp. 1–26.*

Baralis, E. et al., "Declarative specification of constraint maintenance", Entity–Relationship Approach—ER '94, 13th Int'l Conf. on ER Approach Proc., Dec. 1994, pp. 205–222.*

Yoon, J.P. et al., "Databases updates using active rules: a unified approach for consistency maintenance", DB Systems for Adv Applications, '93 Proc. 3d Int'l Symp. on DB, 1993, pp. 271–278.*

* cited by examiner

Primary Examiner—Jean R. Homere
(74) Attorney, Agent, or Firm—Baker & McKenzie

(57) ABSTRACT

In response to a constraint violation in a row of a database table, an output file is generated including the characteristics of the table containing the row in error as well as an SQL UPDATE statement for the row. The SQL UPDATE statement includes the column values in the row which can be corrected by the user, the user modified SQL UPDATE statement being subsequently executed to repair the constraint violation.

18 Claims, 7 Drawing Sheets

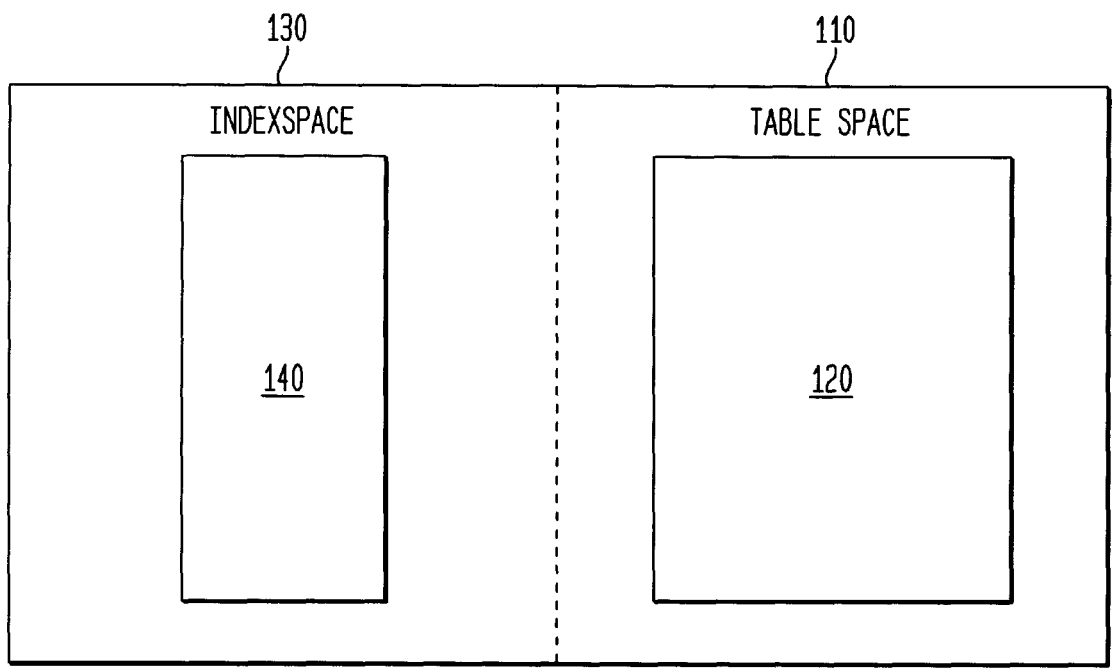

FIG. 3

| CUSTOMER-NUMBER | PRODUCT-CODE | ORDER-NUMBER | BUYER-NAME | SHIP-TO-ZIP |
|---|---|---|---|---|
| 11111 | 0010 | 0001 | JOHN DOE | 60606 |
| 22222 | 0020 | 0002 | JANE DOE | 70707 |
| 33333 | 0030 | 0003 | BILL SMITH | 80808 |
| 44444 | 0040 | 0004 | FRED SMITH | 90909 |

┌ --SSID ──► D41A      DATABASE ──► LNRDBDOC    TABLESPACE ──► SDOCDPP
     │ --TABLENAME ──► TDOCDPP   CREATOR ──► PDLNR      OBID ──► 00013
810 ─┤ --ROWSIZE ──► 00053    FOREIGN KEY ──► Y      CHECK CONST ──► Y
     │ --DATA CAP ──► EDITPROC ──► VALIDPROC ──►
     └ --AUDIT       ──► NONE      RESTRICT ──► Y

┌ --### COLUMN NAME                        COLTYPE    SIZE N   FORDATA
     │ PRIMKEY#FOREIGN-KEY
     │ --  1 DEPT                               CHAR        4N        S
     │ --  2 PRODDATE                           DATE        4N        M
820 ─┤ --  3 PRODTIME                           TIME        3N        M
     │ --  4 PRODCODE                           SMALLINT    2N        M
     │ --  5 PRODQTY                            INTEGER     4N        M
     │ --  6 COMMENT                            VARCHAR    25N        S
     └ --  7 PRICE                              DECIMAL    5,2N       M

831a ─── UPDATE PDLNR.EXTDOCDPP4                          SET  ┐
831b ───    DEPT             ='SALE'                           │
831c ───    ,PRODDATE        ='2004-10-04'                     │
831d ───    ,PRODTIME        ='07.55.34'                       │
831e ───    ,PRODCODE        =0                                ├─ 830
831f ───    ,PRODQTY         =33329                            │
831g ───    ,COMMENT         ='v'                              │
831h ───    ,PRICE           =-.05                             │
831i ───    WHERE RID        ='0000201';                      ┘

UPDATE PDLNR.EXTDOCDPP4                          SET  ┐
            DEPT             ='HRES'                            │
            ,PRODDATE        ='2032-07-05'                      │
            ,PRODTIME        ='07.08.33'                        │
            ,PRODCODE        =3489                              ├─ 830
            ,PRODQTY         =-919858558                        │
            ,COMMENT         ='xb                               │
            ,PRICE           =-755.51                           │
            WHERE RID        ='0000202';                       ┘

UPDATE PDLNR.EXTDOCDPP4                          SET  ┐
            DEPT                    ='LOGI'                     │
            ,PRODDATE        ='1995-05-11'                      │
            ,PRODTIME        ='17.47.11'                        │
            ,PRODCODE        =4210                              ├─ 830
            ,PRODQTY         =39128                             │
            ,COMMENT         ='CA                               │
            ,PRICE           =.74                               │
            WHERE RID        ='0000203';                       ┘
```

METHOD FOR REPAIRING CONSTRAINT VIOLATIONS IN A DATABASE MANAGEMENT SYSTEM

FIELD OF THE INVENTION

The present invention relates to database management systems, and particularly to a method for repairing constraint violations in a database management system.

BACKGROUND INFORMATION

A well known database software program is DATABASE 2 (DB2) database software distributed by IBM Corporation. As is known in the art, DB2 operates as a subsystem in a computer system operating under the IBM MVS operating system software. In a DB2 environment, user data resides in DB2 tables which are in tablespaces. A tablespace is, for example, a portion of storage space in a direct access storage device (DASD) such as a disk drive. For exemplary purposes, illustrated below is an order_entry table that would be stored in a tablespace. The order_entry table contains columns: customer_number; product_code; order_number; buyer_name; and ship_to_zip.

Order_Entry Table

| customer_number | product_code | order_number | buyer_name | ship_to_zip |
|---|---|---|---|---|
| 1111111111 | 0010 | 1234500001 | John Doe | 60606 |
| 1111111111 | 0040 | 1234500002 | Jane Doe | 70707 |
| 3333333333 | 0020 | 1234500003 | Bill Smith | 90909 |
| 2222222222 | 0030 | 1234500004 | Fred Smith | 80808 |

While the above Order_Entry table shows four rows, the table could have millions of rows for all the orders of a company, for example 4 million rows. The order_entry table also has, for example, three index keys and two foreign keys. An index key is an identifier for a particular row of a table while a foreign key also identifies a row but is also used for referential integrity as described below. For example, in the order_entry table, one index key could be based on Order_Number, another index key based on buyer_name and a third index key based on ship_to_zip. As is known in the art, an index key for a particular table indicates a row identification (RID) and a selected value for the row (e.g., the index key value).

The index key can be used to generate an index for the table which facilitates subsequent searches for particular data in the table. For example, the Order_Entry table would have three indexes (e.g., one for each index key), each index being stored in an indexspace. Similar to a tablespace, an indexspace is, for example, a designated portion of a DASD. Thus, if a user was looking for rows that contain a particular buyer name in the Order Entry_table, the database management system could query the buyer index for the table to identify all occurrences of the buyer name without reading the entire table to locate the rows.

DB2 administrators analyze performance characteristics for application programs that access a database table in an attempt to find the optimum index structure for fast access to the database table. The values to be used as an index must be carefully selected because each index results in overhead for the database system. For example, each transaction in a database table, such as an add or delete, requires that each index for the table also be updated. Thus, it is desirable that the number of indexes for a table be minimized to enhance the performance of application programs. The values to be used as an index for a database table are selected based on, for example, data accessed most frequently by users of the table, generally on-line transaction users. Index keys generally are not based on foreign keys, as foreign keys are used primarily for validation purposes (e.g., constraint enforcement).

As is known in the art, each table in a database may be either a parent table, a child table or both. A child table is related to a parent table via the foreign key value or values contained in columns of the child table. For example, a foreign key value can appear multiple times in a child table (e.g., multiple rows in a child table can have the same foreign key, such as the customer_number and product_code entries in the order_entry table) but each foreign key must be associated with a unique key in a parent table of the child table.

Referential integrity ensures that every foreign key value is valid (e.g., has a corresponding primary key in a parent table). Thus, referential integrity (RI) means that a value in the column of a row in the table is valid when this value also exists in an index of another table. A row should not be in a table if it violates a constraint. As the order_entry table illustrated above has two foreign keys, it has a RI constraint on customer_number and product_code. As is known in the art, when a user of a DB2 database management system creates a table, the user also defines the constraints for the table (e.g., the user can define the relational integrity criteria). Illustrated below are an exemplary product table and an exemplary customer table (e.g., the parent tables for the foreign keys in the order_entry table).

Product Table

| product_code | product_description | retail_price |
|---|---|---|
| 00010 | laptop pc | 1000.00 |
| 00020 | desktop pc | 1100.00 |
| 00030 | office pc | 1200.00 |
| 00040 | lan pc | 3500.00 |
| 00050 | home pc | 999.99 |

The product table show five rows, although the table could have thousands of rows for all of the different products of a company. The product table has, for example, an index based on the column product_code, which values are illustrated in ascending order. The values in the column product_code are each unique since there is only one product code assigned to each product and thus in this table, a product code would not be included more than once. Accordingly, an index for the product table would include the key value (e.g., the stored value in the product_code column) and a RID. The product table index would reside in a DB2 indexspace.

The customer table illustrated below shows four rows, although this table could also have thousands of rows for all of the customers of a company. The customer table has, for example, an index based on the column customer_number, which values are illustrated in ascending order. The values in the column customer_number are each unique since there is only one customer_number assigned to each customer name and thus a customer_number would not be included in this table more than once. Accordingly, an index for the customer table would include the key value (e.g., the value of the column customer_number) and a RID. The customer index would also reside in a DB2 indexspace.

| Customer Table | | |
| --- | --- | --- |
| customer_number | buyer_name | customer_address |
| 1111111111 | John Doe | State A |
| 2222222222 | Fred Smith | State B |
| 3333333333 | Bill Smith | State C |
| 4444444444 | Steve Jones | State D |

As shown by the above tables, all of the rows in the Order_Entry table are valid (e.g., there are no referential integrity constraint violations) because the foreign key values in the column product_code of the Order_Entry table also exist in the product table and the values in the column customer_number of the Order_Entry table also exist in the customer table.

Conventional database management systems, such as DB2, provide the user with the ability to identify specific conditions that a row must meet before it can be added to a table. These conditions are referred to as "constraints" because they constrain the values that a row may include. Constraints include, for example, check constraints and referential integrity constraints. Check constraints include, for example, qualifying criteria for a particular value, such as a zip code value (e.g., the ship_to_zip value in the Order_Entry table) being in the range of 00000 to 99999. As discussed above, referential integrity constraints ensure that a value in a row of a table is valid when the value also exists in an index of another table.

Constraint enforcement can be performed prior to loading of data into a database table or after data has already been loaded into a database table. An example of performing constraint enforcement prior to loading data into a database table is provided in co-pending application Ser. no. 09/058,754 filed Apr. 10, 1998, owned by the Assignee of the present application and which is hereby expressly incorporated by reference. If constraint enforcement is performed after loading data into a database table, for example as part of a recovery operation following a hardware of software failure, the constraint enforcement is generally performed by a CHECK utility, such as CHECK DATA by IBM Corp., CHECK PLUS by BMC Software and FASTCHECK by Platinum technology, inc.

Conventional CHECK utilities ensure that data in the table do not violate any constraints that have been established for the table. Constraints can be established at the time the table is generated. For example, constraints can be defined when the table is originally created in the database system and are stored in the DB2 catalog, which can be subsequently queried by a CHECK utility to identify the constraint information.

To perform constraint enforcement, a conventional CHECK utility would, for example, be initialized and identify any applicable constraints for the table to be checked by reading the DB2 catalog, as is known in the art. The CHECK utility would, for example, then read each row of the database table and check for check constraint violations and/or referential integrity constraint violations.

Constraints may be violated for numerous reasons, not all of which require that the row containing the error be deleted. For example, a user might want to correct the error rather than delete the row. An option with some CHECK utilities, such as CHECK PLUS by BMC Software and FASTCHECK by Platinum technology is that if a constraint violation is identified, and thus a row of the database table contains an error, the CHECK utility will produce a DB2 SQL DELETE statement for each row containing a constraint violation. These SQL DELETE statements will be written out to a sequential file which the customer can then use to selectively delete particular rows that are in violation of the constraint(s). For example, in the Order_Entry table illustrated above, a data entry error in the customer_number would not render the order invalid but rather may reflect an error that can be corrected, thus allowing continued processing of the order (e.g., it may be more desirable to fix the error than delete the row).

Other conventional CHECK utilities, such as the IBM CHECK DATA utility, do not generate SQL DELETE statements but do include an option to delete all of the rows in error. A disadvantage of this approach, however, is that the user has no way of individually selecting the particular error rows to be deleted.

The SQL DELETE statements generated by conventional CHECK utilities are based on the foreign key value that violates the constraint. For example, when the SQL DELETE statement is generated by the CHECK utility, the statement uses the key value causing the constraint violation. For example, if the customer number 99999 was read by a CHECK utility while checking the Order_Entry table illustrated above and the customer number 99999 violated a referential integrity constraint (e.g., it was not in a parent index for the parent customer table), then the CHECK utility would generate a SQL DELETE statement using the foreign key value that violated the constraint (i.e., customer number=99999).

Thus, when the SQL DELETE statement is generated using a key value that is not indexed for the table and is executed, the entire database table must be read for each DELETE statement to determine if the foreign key value identified in the SQL DELETE statement is contained in any row of the database table. As mentioned previously, generally foreign key values are not used as an index for a database table and thus no index values are available for use by the DELETE statements utilizing a foreign key value to facilitate deletion of rows containing errors. Therefore, as each DELETE statement generated by the CHECK utility deletes any row that matches the foreign key that is in error, and if the database table contains millions of rows, each of the millions of rows would have to be read for each executed DELETE statement. If even only two rows contain the key value used in the DELETE statement, all of the rows of the table would have to be read. Thus, significant processing time can be consumed as part of the constraint enforcement process due to the need to read an entire database table multiple times.

When a constraint violation is identified, for example due to a DASD failure where a database table is recovered and the recovery process has induced some errors, a user would probably not want to delete the row in error. Instead, the user would want to fix the row, particularly where the data was valid before the failure. Similarly, a LOAD operation without constraint enforcement could be used to load new rows containing customer orders into an Order Entry table. If any constraint violations are identified in the newly loaded data, the user would want to correct the errors, not delete new orders. Conventional CHECK utilities do not, however, provide a tool to correct the rows in error other than deletion of the rows.

For example, the generation of SQL DELETE statements by conventional CHECK utilities do not provide a mechanism to facilitate correction of selected rows containing a constraint violation. The generation of the DELETE statements only provides the option of deleting the row. Correction of the row requires that the user generate a script (e.g., SQL code) to make any desired corrections for each row in error. For example, to correct a row identified as containing a constraint violation, the user of the database system must develop a corrective action plan. Usually, the user will manually code and test SQL statements to fix the rows in error. If there are, for example, 1,000 rows in error, the user would have to produce 1,000 SQL statements to correct the rows as each row requires its own SQL statement. The generation of numerous SQL statement is often plagued by errors introduced during the correction process. Further, most database management system users have numerous DB2 tables to maintain, for example 1,000 DB2 tables, each table having multiple columns of varying data types that may contain an error, thus further complicating the row correction process. Therefore, there is a need to improve the error correction process for rows containing a constraint violation.

In addition, the mechanism used by conventional CHECK utilities used to identify a row containing a constraint violation, typically the row identification (RID), has limited value to a user. The user would prefer to know the data value in error, for example a customer number or an order number which is a value that is meaningful to the user, instead of a page number and row number that can be used by DB2. In contrast to the limited and DB2-oriented information provided by conventional CHECK utilities, the database user wants as much as information as possible rather than merely the location of the row-the user is more interested in the entire contents of the row including the columns in error.

SUMMARY OF THE INVENTION

According to an embodiment of the present invention, in response to a constraint violation in a row of a database table, an output file is generated to facilitate updating the rows containing a constraint violation. The output file includes, for example, the characteristics of the table containing the row in error as well as an SQL UPDATE statement for each row in error. The SQL UPDATE statement is automatically generated and includes, for example, the values of the columns in the row, any of which can be corrected by the user. The modified SQL UPDATE statement can be subsequently executed to implement the desired corrections in the database table.

BRIEF DESCRIPTION OF THE DRAWINGS

FIG. 1 illustrates an indexspace and a tablespace to be checked for constraint violations according to an exemplary embodiment of the present invention.

FIG. 2 is an exemplary index according to an embodiment of the present invention.

FIG. 3 is an exemplary database table according to an embodiment of the present invention.

FIG. 8 illustrates an exemplary output file according to an embodiment of the present invention.

DETAILED DESCRIPTION OF THE INVENTION

FIG. 1 illustrates a tablespace 110 including a database table 120 and an indexspace 130 including an index 140. FIG. 3 illustrates a more detailed representation of table 120. Similar to the example Order_Entry table used earlier, table 120 includes columns 311–315 and rows 321–325 for an exemplary Order Entry table. The intersection of each column and row of table 120 contains an entry, which may be a unique or non-unique value. For example, column 311 contains the customer_number entries, which may be non-unique values as the same customer may have multiple orders pending in the Order_Entry table 120. Column 313 of table 120 contains order_number entries, each of which is a unique value as each order placed by a customer is assigned a unique number. Also as shown in FIG. 3, column 312 in table 120 contains product_code entries, column 314 contains buyer_name entries and column 315 contains ship_to_zip entries, all of which are non-unique values.

FIG. 2 illustrates a more detailed representation of index 140. Index 140 illustrates an index for table 120 on the order_number column 313 of table 120. Accordingly, index 140 includes two columns 211 and 212 containing, respectively, a row identification (RID) and associated index value, in this case the order_number entries for rows 322–325 of table 120. The order_number column is selected as an index for the Order_Entry table 120 because, for example, it is not a foreign key value for table 120 and the order numbers are each unique values. The ship_to_zip or buyer_name columns could also be used as index values for table 120. Index 140 is defined, for example, after the database table has been created and a database administrator has conducted some conventional performance analysis on the table, for example evaluating the most commonly accessed values of the database table by on-line users, to determine which column of the table should be selected for the index 140.

Figure 4:
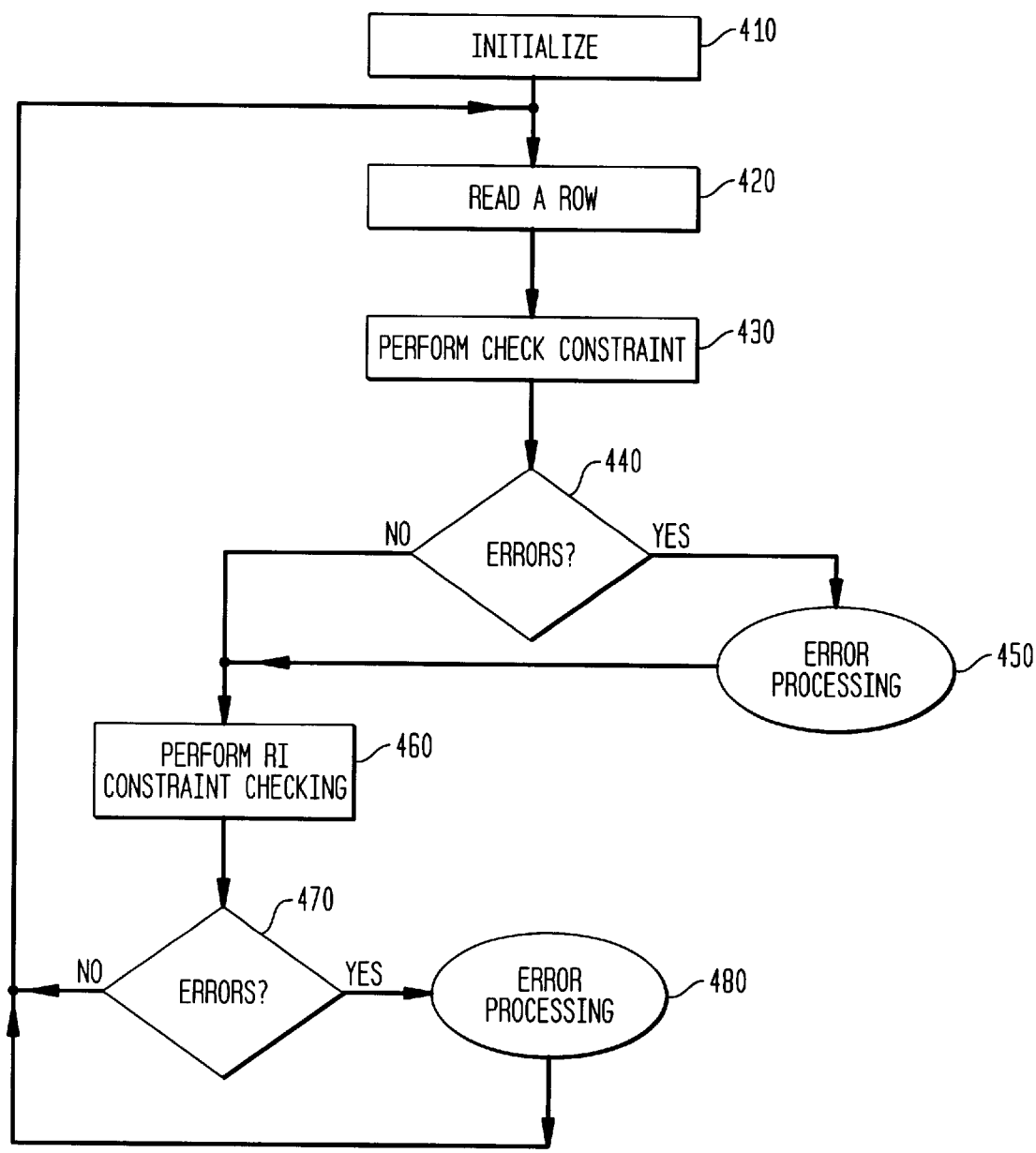
FIG. 4 is an exemplary flowchart for enforcing constraints according to an embodiment of the present invention.

FIG. 4 illustrates an exemplary flowchart for a method of enforcing constraints according to an embodiment of the present invention. In step 410, a CHECK utility is initialized to enforce constraints on a database table, such as table 120 illustrated in FIG. 2. As is known in the art CHECK utilities are generally initialized each time a tablespace is to be checked. The CHECK utility could include, for example, CHECK-DATA by IBM Corp., CHECK PLUS by BMC Software or FASTCHECK by Platinum technology, inc. In step 420, the CHECK utility reads a row of a database table, data already having been loaded into the database table. In step 430, check constraint enforcement is performed. Check constraint enforcement can be performed in any conventional manner. In step 440, it is determined if there are any check constraint violations. If a check constraint violation is identified in step 440, then error processing according to an embodiment of the present invention occurs in step 450. For example, a printed report of the constraint violation is generated and a SQL DELETE statement is generated so that the row containing the constraint violation can be deleted. According to the present invention, the SQL DELETE statement is generated by the CHECK utility utilizing an index value associated with the row containing the constraint violation, which may differs from the foreign key value causing the constraint violation. In another embodiment of the present invention, the CHECK utility can also check if a DELETE statement has already been generated for the row due to a previous check constraint violation, thus avoiding generation of duplicative DELETE statements.

If no check constraint violation is identified in step 440, then in step 460, referential integrity constraint enforcement is performed. Referential integrity constraint enforcement can be performed in any conventional manner. If a referential integrity violation is detected in step 470, then error processing according to an embodiment of the present invention occurs in step 480. For example, a printed report of the constraint violation is generated and a SQL DELETE statement is generated utilizing the index value associated with the row. A check can be made to verify that a DELETE statement for the row has not yet already been generated, for example, due to a previously identified CHECK constraint violation. For example, a flag can be set in the CHECK utility when a DELETE statement is generated for a row. The status of the flag (e.g., set or not set) can be verified by the CHECK utility for each row prior to generating a DELETE statements for the row, thereby avoiding duplicative generation of DELETE statement for a particular row. After error processing in step 480 is completed, or if no referential integrity violation is identified in step 470, the process returns to read the next row in the database table at step 420, this looping continuing until each row in the database table has been reviewed for constraint violations.

Figure 5:
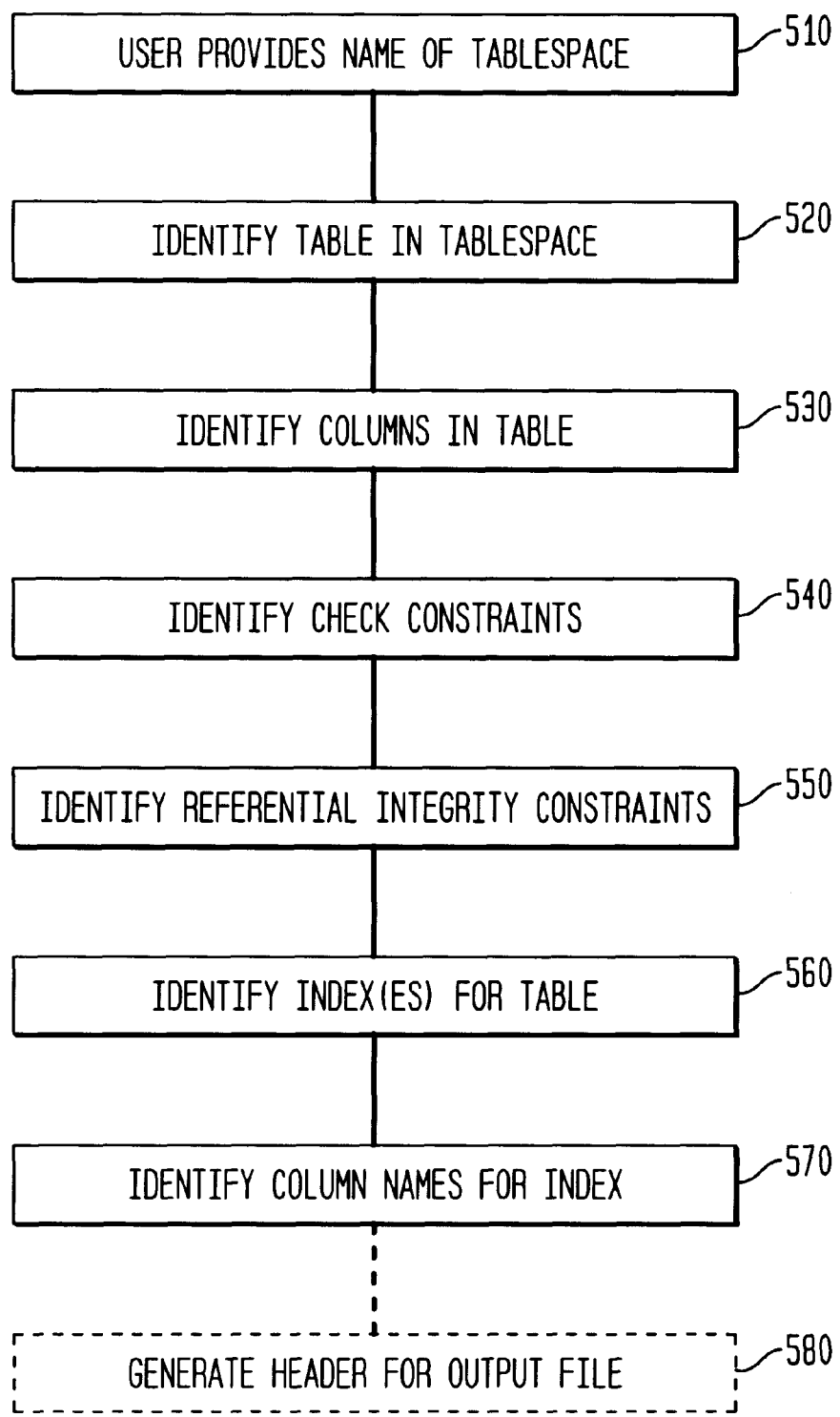
FIG. 5 is an exemplary flowchart for initialization of a CHECK utility according to an embodiment of the present invention.

FIG. 5 illustrates exemplary initialization processing of a CHECK utility according to an embodiment of the present invention, such as performed in step 410 of FIG. 4. In step 510, a user of the CHECK utility provides a name of a tablespace which is to be subject to constraint enforcement. For example, the user can input the name of the tablespace via an I/O device such as a keyboard to the computer system operating the database management system and the CHECK utility. In step 520, the CHECK utility identifies the database table located in the tablespace identified by the user, for example by reading the DB2 catalog. Usually, there is only one database table in a tablespace.

In step 530, the CHECK utility identifies the columns in the database table so that, for example, when an index is identified for the table the CHECK utility can identify the column name for the index value and locate the corresponding column in the database table to retrieve the index value to be used in generating the SQL DELETE statement according to an embodiment of the present invention. Performing this step during initialization precludes the need to identify the appropriate column in the database table each time a SQL DELETE statement is generated. Also, during the initialization process, the CHECK utility can flag the column(s) in the database table that contain index values and subsequently locate the flagged columns if there is a constraint violation to obtain the column name and value to be used in generating the DELETE statement.

In step 540, the CHECK utility identifies any check constraints that may apply to the table. Similarly, in step 550, the CHECK utility identifies any referential integrity constraints that apply to the database table. In step 560, the CHECK utility identifies the index or indexes that have been defined for the table. If only one index is defined for the table, then that index is identified by the CHECK utility. If more than one index is defined for the table, then the CHECK utility would, for example, select the index based on unique values, which can be determined via the DB2 catalog (e.g., the uniquerule data contained in the DB2 catalog). If no unique index value exists, then the CHECK utility could use, for example, the first non-unique index. In step 570, the CHECK utility identifies the column names for the index defined for the database table and identified by the CHECK utility.

Applicable check constraints can be identified by, for example, the CHECK utility reading the DB2 catalog (e.g., the SYSIBM.SYSCHECKS table in the catalog). The check constraints that apply are defined, for example, when the table is created in the database system and are stored in the DB2 catalog. The following is an example of how a conventional CHECK utility would read the SYSCHECKS table in a DB2 catalog.

---
SELECT CHECKNAME, CHECKCONDITION
  FROM SYSIBM.SYSCHECKS
   WHERE CREATOR = :#CCR_CREATOR,
     AND TBNAME  = :#CCR_TBNAME;
---

If no check constraints are defined for the table, then, for example, DB2 returns to the CHECK utility a SQL code of +100. If a check constraint is defined for the table, then the DB2 catalog returns a row value identifying the check constraint. The row value is the check predicate from which check constraint routines can be compiled and built by the CHECK utility, as is known in the art.

Referential integrity constraints applicable to the table can be identified by a conventional CHECK utility by, for example, the CHECK utility reading the DB2 catalog (e.g., the SYSIBM.SYSRELS table of the DB2 catalog). The referential integrity constraints that apply are defined, for example, when the table is created in the database system and are stored in the DB2 catalog, which can be subsequently queried for the information as described above. For example, the following is exemplary code for a conventional CHECK utility to read the SYSRELS table in the DB2 catalog:

---
    SELECT  REFTBNAME            ,
        REFTBCREATOR             ,
        RELNAME                  ,
        IXOWNER                  ,
        IXNAME
    FROM  SYSIBM.SYSRELS
        WHERE CREATOR = :#RELS_CHILD_CREATOR,
        AND TBNAME = :#RELS_CHILD_TBNAME;
---

If no referential integrity constraints are defined for the table, then a SQL code of +100 is returned to the CHECK utility by the DB2 catalog. If a referential integrity constraint does apply to the table, however, then the DB2 catalog returns the row value for each referential integrity constraint parent table (e.g., the DB2 catalog provides the row of the SYSIBM.SYSRELS table having a column with the name of the parent table for the referential integrity constraint). More than one row can be returned by the DB2 catalog if more than one referential integrity constraint is defined for the table. The CHECK utility would then, for example, read the DB2 catalog to identify the column names for the foreign keys for the referential integrity constraints, for example by reading the SYSFOREIGNKEYS table in the DB2 catalog. Exemplary code for how a conventional CHECK utility would read the SYSFOREIGNKEYS table is set forth below:

```
SELECT
    CREATOR,
    TBNAME,
    RELNAME,
    COLNAME,
    COLSEQ
FROM SYSIBM.SYSFOREIGNKEYS
ORDER BY 1, 2, 3, 5;
```

If referential integrity constraints apply, the parent index for each applicable referential integrity constraint is identified by the CHECK utility. For example, the CHECK utility can read the DB2 catalog (e.g., the SYSIBM.SYSINDEX table of the DB2 catalog) for each parent table and the DB2 catalog will return the name of the parent index for the parent table. For example, the following is exemplary code for a CHECK utility to read the SYSINDEX table of the DB2 catalog:

```
SELECT
    INDEXSPACE,
    UNIQUERULE
FROM SYSIBM.SYSINDEXES
    WHERE TBNAME=#RELS_PARENT_TBNAME,
    AND TBCREATOR=#RELS_PARENT_CREATOR;
```

In addition to the CHECK utility accessing the DB2 catalog during initialization of the CHECK utility, for example to determine if any check constraints or referential integrity constraints apply to the table, as illustrated in steps 510 to 550 of FIG. 5, the CHECK utility performs additional steps 560 and 570 during initialization in an embodiment of the present invention. As shown in FIG. 5, in step 560 the CHECK utility determines the index or indexes that have been defined for the table. The CHECK utility can determine the index or indexes by reading the DB2 catalog, for example using the SYSIBM.SYSINDEXES table in the DB2 catalog. The following is exemplary code for the CHECK utility to read the SYSINDEXES table:

```
SELECT NAME, CREATOR, UNIQUERULE
FROM SYSIBM.SYSINDEXES
WHERE TBNAME="NAME",
AND TBCREATOR="NAME OF CREATOR";
```

In response to this query from the CHECK utility, the DB2 catalog will return all of the indexes that have been defined for the table. For example, there will be one row in the SYSINDEXES table for each index of the table. Using the database table illustrated in FIG. 3, DB2 would return to the CHECK utility a row from the DB2 catalog indicating that the order_number index 140 illustrated in FIG. 2 has been defined for the Order_Entry table 120.

Also as shown in FIG. 5, in step 570, the CHECK utility identifies the column names for the index or indexes identifies in step 560. The CHECK utility can determine the column names by, for example, reading the SYSIBM.SYSKEYS table in the DB2 catalog. The following is exemplary code for the CHECK utility to read the SYSKEYS table:

```
SELECT COLNAME
FROM SYSIBM.SYSKEYS
WHERE IXNAME="NAME OF INDEX";
    AND IXCREATOR="NAME OF CREATOR";
```

Thus, using the Order_Entry table 120 example, step 570 returns to the CHECK utility the column name order_number as the column name of the index defined for database 120. As will be described below, this column name can be used by the CHECK utility to select the index value from a row containing a constraint violation to be used in generating a DELETE statement according to an embodiment of the present invention.

Figure 6:
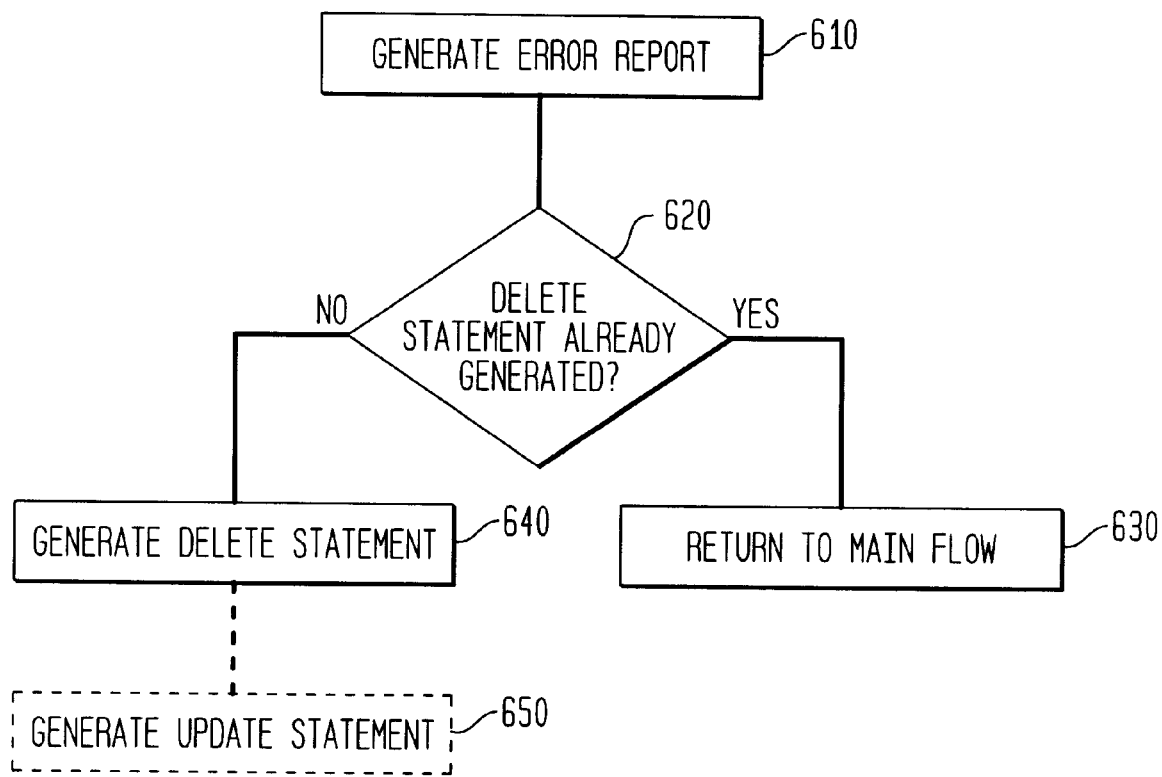
FIG. 6 is an exemplary flowchart for error processing according to an embodiment of the present invention.

FIG. 6 illustrates exemplary error processing according to an embodiment of the present invention, such as the error processing identified in step 450 of FIG. 4. If, for example, a check constraint violation is identified in steps 430 and 440 of FIG. 4, then in step 610 of FIG. 6, an error report is generated by the CHECK utility. The error report can include, for example, a printout of the row identification for the row in error and the value violating the check constraint. In step 620, the CHECK utility determines if a SQL DELETE statement has already been generated for the row. For example, a previous check constraint violation may have caused a SQL DELETE statement to be generated already and thus another DELETE statement is not required. As explained previously, a flag in the CHECK utility can be used to determine if a DELETE statement has already been generated for a particular row. If a DELETE statement has already been generated, then in step 630, the CHECK utility returns to the main processing flow, such as proceeding to step 460 in FIG. 4 to check for referential integrity or looping back to step 430 in FIG. 4 to check for additional check constraint violations. If a SQL DELETE statement has not been generated for the row containing the check constraint violation, then in step 640 a SQL DELETE statement is generated. According to an embodiment of the present invention, the SQL DELETE statement does not utilize the particular value that caused the constraint violation. Rather, the SQL DELETE statement utilizes an index value associated with the row that contains the constraint violation. An exemplary SQL DELETE statement generated according to an embodiment of the present invention has the form of

DELETE FROM TABLENAME WHERE COLNAME="INDEX VALUE";.

The generation of the DELETE statement according to an embodiment of the present invention is facilitated, for example, by the steps performed by the CHECK utility during initialization as described with regard to FIG. 5. For example, while conventional CHECK utilities generally perform the functions illustrated in steps 510–550 of FIG. 5, according to the present invention additional steps 560 and 570 are performed so that the CHECK utility identifies the index or indexes defined for the table to be checked as well as the column names for the index or indexes.

With this additional information, the CHECK utility can associate an index value with any row that contains a constraint violation by reading the column of the row containing the index value (e.g., identified during initialization) and using the content of that column as the index value for the generation of the SQL DELETE statement for the row. When the DELETE statements are generated they can be output to a file that can be subsequently reviewed and particular DELETE statements selected for execution.

For example, when the CHECK utility reads the database table 120 to perform constraint enforcement, the values contained in each column of the row are available to the CHECK utility. The column containing the index value is also known to the CHECK utility via the initialization process (e.g., steps 560 and 570 in FIG. 5) and thus if a constraint violation is identified, then the index value can be located in the appropriate column by the CHECK utility and used for generating the DELETE statement.

Therefore, as a result of the method according to the present invention, when the user of the database system determines that a SQL DELETE statement is to be executed, DB2 does not have to read the entire database table to identify any rows containing the key value that failed the check constraint. Rather, DB2 can use the column name and index value used in the DELETE statement to identify, for example, the page containing the row to be deleted and then read only that page to find and delete the row containing the constraint violation. For example, the DELETE statements generated according to an embodiment of the present invention would utilize the column name order_number and the index values contained in column 313 of FIG. 3, which would allow DB2, when executing the DELETE statement, to access the index 140 to identify the RID of the row to be deleted. Accordingly, by generating the DELETE statements in the manner according to an embodiment of the present invention, the need to read millions of rows in a database table has been eliminated and only the rows on the page containing the row to be deleted are read.

Figure 7:
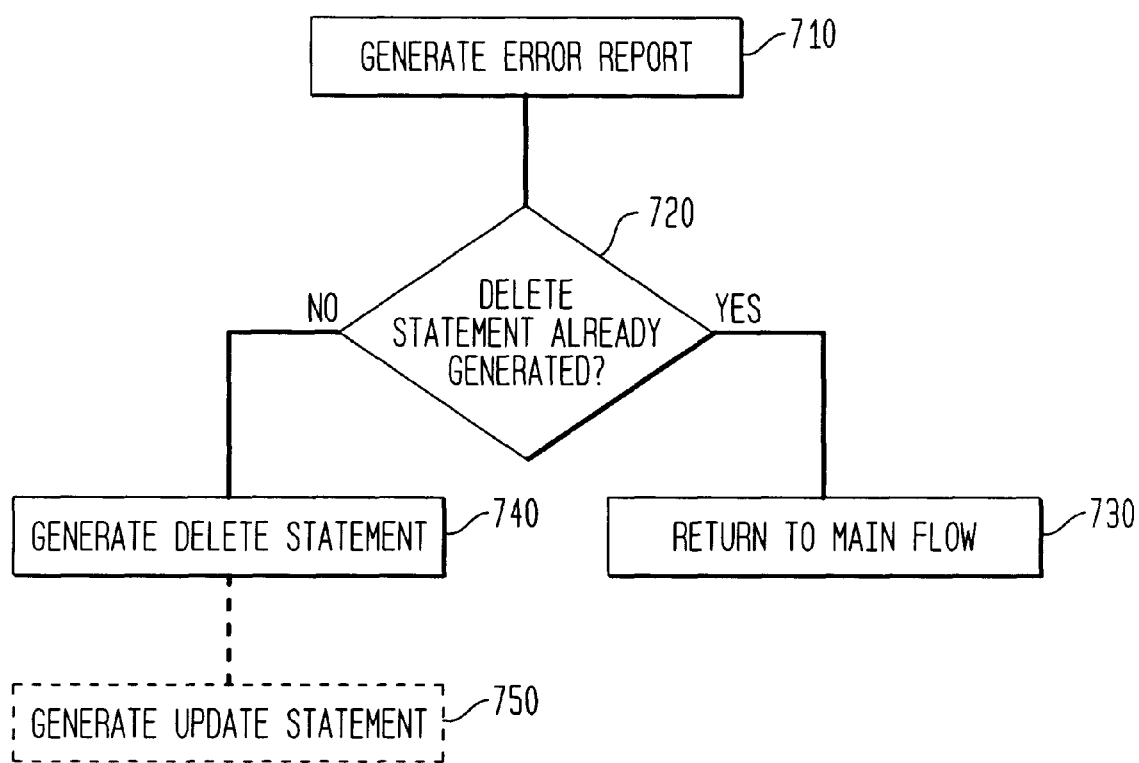
FIG. 7 is another exemplary flowchart for error processing according to an embodiment of the present invention.

FIG. 7 illustrates exemplary error processing according to an embodiment of the present invention when, for example, a referential integrity constraint violation is identified in steps 460 and 470 of FIG. 4. In step 710 of FIG. 7, an error report is generated. The error report can include, for example, a printout of the row identification and value violating the referential integrity constraint, similar to the error report for a check constraint violation. In step 720, the CHECK utility determines if a DELETE statement has already been generated for the row containing the referential integrity constraint violation, for example in the manner described with regard to FIG. 6. If step 720 determines that no DELETE statement has been generated for the row, then a DELETE statement is generated for the row in step 740 using the column name and index value associated with the row and not the particular key value that violated the referential integrity constraint, in the same manner described above with respect to FIG. 6. If a DELETE statement has already been generated, then the CHECK utility returns to the main flow in step 730, for example reading the next row in the database table.

If, for example, the index defined for a database table was not based on a unique value, then the key value that violates the constraint can be used in conjunction with the non-unique index value. For example, if an index was defined for database table 120 based on ship_to_zip, the index value would not uniquely identify a particular row in the table but rather would identify a subset of rows in the table (e.g., all the rows on the table having a particular ship_to_zip value). Thus, a key value violating a constraint, such as customer number=99999, could be combined with the index value for use in generating the SQL DELETE statement in the CHECK utility. For example, the DELETE statement could have the form of:

DELETE FROM ORDER_ENTRY
WHERE SHIP_TO_ZIP="60606" AND
CUSTOMER_NUMBER="99999";

Therefore, utilizing the method for enforcing constraints according to the present invention with a database table having a defined index based on non-unique values, the number of rows to be read can be significantly reduced by generating SQL DELETE statements for rows containing constraint violations utilizing an index value associated with the row. For example, the above example would result in DB2 reading the page containing each row having a ship_to_zip value of 60606 to determine if any such row contained a customer_number of 99999. In contrast, without the method according to the present invention, each row of the database table would have to be read when the DELETE statement was executed instead of only a subset of rows.

In addition to the generation of SQL DELETE statements based on an index value, an output file is also generated for the database table including a SQL UPDATE statement for each row containing a constraint violation. Thus, according to an embodiment of the present invention, a user of the database table has the option of deleting a row in error or correcting the row using the UPDATE statement.

FIG. 8 illustrates an exemplary output file 800 generated according to an embodiment of the present invention to facilitate repair of a constraint violation in a row of a database table. The output file 800 can be generated, for example, via a conventional CHECK utility or by a separate stand-alone utility for repairing constraint violations according to an embodiment of the present invention. Regardless of the particular implementation of the method for repairing constraint violations according to the present invention, the information needed to carry out the invention can be obtained, for example, by reading the DB2 catalog during an initialization phase as described above with regard to FIG. 5. For example, following step 570 in FIG. 5, additional step 580, indicated in dashes, can be performed to generate the first and second portions of output file 800 based on the information obtained from steps 510–570. The format illustrated in FIG. 8 for output file 800 is merely exemplary and any suitable format can be utilized.

FIG. 8 illustrates a first portion 810 of the output file 800 including, for example, the name of the table, the creator of the table, the OBID of the table, the rowsize of the table, whether any referential integrity or check constraints apply to the table, the subsystem ID of the table, the database name of the table, the tablespace name for the table and values for EDITPROC, VALIDPROC, AUDIT, RESTRICT and EXPLAIN for the table. The information provided in section 810 can be obtained by, for example, reading the DB2 catalog and provides a user of the database table with details on the structure of the database table.

Section 820 of output file 800 provides, for example, the column number and name for each column in the database table along with the column type and size of each column. For example, the column type can be character, data, integer, time, variable character, decimal, etc. The information provided in section 820 can be obtained by, for example, reading the DB2 catalog. By providing a user of the database table with the information contained in sections 810 and 820 of output file 800, knowledge of the structure and content of the database table can be provided to the user at the time corrective action is needed to repair a row. If the user decides to correct a row of the database table, the user has sufficient information to carry out such a task, for example the column name, column type and byte size for particular columns which are needed to take corrective action for a row in error.

According to an embodiment of the present invention, a user does not need to generate corrective SQL statements as required with conventional database systems. SQL UPDATE statements 830 are automatically generated as shown in FIG. 8 as part of the output file 800. The utility implementing the method for repairing constraint violations according to an embodiment of the present invention can be coded in software in any conventional manner to generate the exemplary format for an SQL UPDATE statement illustrated as element 830 in FIG. 8. The generation of a SQL UPDATE statement 830 can be triggered, for example, by the identification of a constraint violation if the repair method is included in a CHECK UTILITY. For example, FIGS. 6 and 7 illustrate error processing according to an embodiment of the present invention including additional steps 650 and 750, respectively, for generating a SQL UPDATE statement 830 for each row containing a constraint violation after a SQL DELETE statement is generated for the row. Using the information obtained by the CHECK utility in performing constraint enforcement, the constraint repair utility would generate the SQL UPDATE statement and write the statement into output file 800.

If the repair method according to an embodiment of the present invention is implemented as a stand-alone utility, then the generation of a SQL UPDATE statement could occur, for example, in response to reading an error report generated by a conventional CHECK utility, which would provide the RID and constraint violation for each row in error and would serve as input to the stand-alone utility. In such a circumstance, the initialization of the stand-alone utility would occur separate from the initialization process illustrated in FIG. 5 for a CHECK utility but would operate similarly.

The information provided in sections 810 and 820 of output file 800 enhance the user's ability to revise the contents of the UPDATE statement 830 to repair a constraint violation in a row of a database table according to an embodiment of the present invention. Each UPDATE statement 830 generated in response to a constraint violation includes, for example, the SQL UPDATE command for the database table to be updated as well as a listing of the value contained in each column of the row, identified as elements 831a–831i or a subset of the values identified as elements 831a–831i. In another embodiment of the present invention, the SQL UPDATE statement 830 can include only the column value causing the constraint violation. If a user reviewed, for example, the first UPDATE statement 830 and wanted to change the value 831g in the comment column, the information provided in section 820 would inform the user that any value placed in the comment column could have a size of up to 25 bytes. As the user may be responsible for or interact with numerous tables, each of which have a different structure, providing the details on the configuration of each database table in sections 810 and 820 as well as the row in error greatly facilitates the user's ability to effectively and efficiently repair constraint violations.

According to an embodiment of the present invention, all that a user must do to repair a constraint violation in a row of a database table is revise the data provided in section 830, which is the SQL UPDATE statement to be used to implement the repair and which has already been generated in response to the identification of the constraint violation. Once revised, the SQL UPDATE statement shown as section 830 can be executed by DB2 to repair the constraint violation—the user does not need to generate or debug any SQL statements. The benefit to a user trying to correct rows including a constraint violation according to the present invention utilizing for example, a pre-generated SQL UPDATE statement including a current set of values for each column of the row that can be modified as well as information on the structure and content of the database table is exemplified when compared to the provision of only the RID and constraint violation by prior art CHECK utilities, which are of limited value in helping a user identify the data in the row and generate the SQL statement needed to fix the row.

Without the output file according to an embodiment of the present invention, in order to repair rows of a database table containing a constraint violation, a user would have to obtain the necessary values for the row in error to generate an SQL UPDATE statement for each row. While the error report provided by a conventional CHECK UTILITY only identifies the name of the row in error and thus does not implement any corrective action other than deletion, the error report can be used in conjunction with the output file 800 according to an embodiment of the present invention to repair a constraint violation. For example, the RID listed in an error report can be used for correlation to the SQL UPDATE statement 830 for the same RID, identified in statement 830 as element 831i.

According to the present invention, a stand-alone utility or a CHECK utility incorporating the method according to the present invention can generate the output file 800. Once the output file is created, the customer updates the output file 800 as necessary and then executes the output file to repair the constraint violations. Thus, the user no longer has to manually generate a SQL statement for each row with an error. The output file 800 is executed using, for example, SPUFI, the output file 800 according to an embodiment of the present invention being the input file to SPUFI. The executed output file can operate on, for example, the database table to be corrected or an exception table as described below.

Although the method for repairing constraint violations according to an embodiment of the present invention can be implemented as a stand-alone utility using, certain advantages are obtained by including the present invention as part of a CHECK utility. For example, if operated as a stand-alone utility, the utility would have to perform the initialization process illustrated in FIG. 5 including additional step 580 to generate the header information (e.g., portions 810 and 820) for the output file 800. If included in a CHECK utility, however, separate read operations would not have to be performed as the portions 810 and 820 of output file 800 could be generated during the CHECK utility initialization process. SQL UPDATE statements 830 would then be added to the output file 800 as constraint violations are identified.

If operated as a stand-alone utility, each row containing a constraint violation would have to be read separately from the CHECK utility read of the row performed for the constraint enforcement to generate each SQL UPDATE statement. If included in a CHECK utility, however, the UPDATE statements could be generated using the information read by the CHECK utility for constraint enforcement. Thus, the information needed to generate the SQL UPDATE statement for each row in error could be obtained with less I/O operations if the method for repairing constraint violations according to the present invention was included in a CHECK utility.

In another embodiment of the method for repairing constraint violations according to the present invention, an exception table is used. As is known in the art, an exception table is generated prior to each time a CHECK utility operates upon a table (e.g., a new exception table is generated or a prior exception table replaced each time constraint enforcement is performed). For example, when a user creates a job stream to execute a CHECK utility, a step of the job stream includes creating a new exception table. The exception table is, for example, a mirror image of the database table except that the exception table only contains the rows including a constraint violation. For example, each time a CHECK utility identifies a constraint violation, the CHECK utility copies the entire row into the exception table. Exemplary code to copy rows in error into an exception table is as follows.

```
         INSERT INTO PDLNR.EXTDOCDPP4
         VALUES      ('SALE'
                     ,'2004-10-04'
                     ,'07.55.34'
                     ,0
                     ,'v'
                     ,33329
                     ,-.05
                     ,X'0000201'
                     ,CURRENT TIMESTAMP);
```

As shown by the above code, a row containing a constraint violation in database table PDLNR.TDOCDPP will be copied into exception table PDLNR.EXTDOCDPP4.

When the SQL UPDATE statements 830 are generated according to an embodiment of the present invention and a user has made the desired corrections to the UPDATE statements, then the UPDATE statements 830 are executed and operate upon the rows stored in the exception table. Applying the UPDATE statements against the rows in the exception table minimizes the number of changes applied to the database table and provides an opportunity for the user to verify that the proper corrections have been made to each row. Once the user is satisfied that the proper corrections have been made to the rows in the exception table, then the corrected rows can be inserted into the database table. For example, a SQL INSERT statement can be used to insert the corrected rows from the exception table into the database table. A sample SQL INSERT statement is as follows.

```
    --INSERT INTO PDLNR.TDOCDPP          SELECT
    --      DEPT
    --      ,PRODDATE
    --      ,PRODTIME
    --      ,PRODCODE
    --      ,PRODQTY
    --      ,COMMENT
    --      ,PRICE
    --FROM PDLNR.EXTDOCDPP4
```

Using, for example, the above code, the values contained in the various columns (e.g., DEPT, COMMENT, PRICE) for each row that has been repaired are inserted into the database table PDLNR.TDOCDPP4 from the exception table PDLNR.EXTDOCDPP4. As mentioned previously, the UPDATE and INSERT statements can also utilize only the value causing the constraint violation. The dashes before each line of code indicates a comment line which is not executed by the utility when the UPDATE statements are generated and executed. Once the UPDATE statements have been satisfactorily applied to the exception table, then the dashes can be removed and the SQL INSERT statement executed by DB2 to move the repaired rows into the database table.

What is claimed is:

1. A method for repairing a constraint violation in a database table, comprising the steps of:

generating an output file for a database table, the database table containing a row including a constraint violation; and generating an update statement for the row including the constraint violation, the update statement being stored in the output file and including a current value for predetermined columns of the row, each current value being modifiable to repair the constraint violation.

2. The method according to claim 1, wherein the output file includes a description of the database table.

3. The method according to claim 2, wherein the description includes a name of each column in the database table.

4. The method according to claim 3, wherein the description further includes a column type for each column of the database table.

5. The method according to claim 4, wherein the description further includes a size of each column in the database table.

6. The method according to claim 1, wherein the update statement includes a SQL UPDATE statement operable with a DB2 database management system.

7. The method according to claim 1, further comprising the step of modifying the update statement to repair the row including the constraint violation.

8. The method according to claim 7, further comprising the step of executing the update statement to repair the row including the constraint violation.

9. The method according to claim 8, further comprising the step of inserting the repaired row into the database table.

10. The method according to claim 8, further comprising the step of inserting the repaired row from an exception table into the database table.

11. The method according to claim 1, further comprising the step of executing a CHECK utility on the database table to identify the row including the constraint violation.

12. The method according to claim 1, wherein the constraint violation includes one of a check constraint violation and a referential integrity constraint violation.

13. A method for repairing a constraint violation in a database table, comprising the steps of:

generating an output file for a database table containing a row having a constraint violation; and generating an update statement for the row containing the constraint violation, the update statement being stored in the output file and including a current value of the row causing the constraint violation.

14. The method according to claim 13, further comprising the step of modifying the current value in the update statement to repair the constraint violation.

15. The method according to claim 14, further comprising the step of executing the modified update statement.

16. The method according to claim 15, further comprising the step of replacing the row in the database table containing the constraint violation with the repaired row.

17. The method according to claim 16, wherein the step of replacing the row includes inserting the repaired row from an exception table into the database table.

18. The method according to claim 13, wherein the step of generating the output file includes storing information describing a configuration of the database table in the output file.

* * * * *